US011620361B2

(12) United States Patent
Jakkula et al.

(10) Patent No.: US 11,620,361 B2
(45) Date of Patent: Apr. 4, 2023

(54) PROACTIVE PRIVACY CONTENT HOSTING

(71) Applicant: International Business Machines Corporation, Armonk, NY (US)

(72) Inventors: Satyam Jakkula, Bengaluru (IN); Sarbajit K. Rakshit, Kolkata (IN); Raghuveer Prasad Nagar, Kota (IN); Manjit Singh Sodhi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 17/190,574

(22) Filed: Mar. 3, 2021

(65) Prior Publication Data
US 2022/0284078 A1 Sep. 8, 2022

(51) Int. Cl.
H04L 29/06 (2006.01)
G06F 21/10 (2013.01)
G06F 21/62 (2013.01)

(52) U.S. Cl.
CPC .............. *G06F 21/10* (2013.01); *G06F 21/62* (2013.01); *G06F 2221/0724* (2013.01)

(58) Field of Classification Search
CPC .................. G06F 21/10; G06F 21/62
See application file for complete search history.

(56) References Cited

U.S. PATENT DOCUMENTS

| 8,666,110 | B2 | 3/2014 | Yoo et al. | |
| 10,255,415 | B1* | 4/2019 | Siavoshy | G06F 21/31 |
| 2006/0028488 | A1 | 2/2006 | Gabay et al. | |
| 2006/0090082 | A1* | 4/2006 | Apostolopoulos | H04N 21/63345 348/E7.056 |
| 2007/0260627 | A1 | 11/2007 | Knittel et al. | |
| 2013/0141530 | A1 | 6/2013 | Zavesky | |
| 2018/0176484 | A1 | 6/2018 | Nevatie | |
| 2018/0232528 | A1* | 8/2018 | Williamson | G06N 20/00 |
| 2018/0324382 | A1 | 11/2018 | Rantalainen | |

FOREIGN PATENT DOCUMENTS

WO 2013186278 A1 12/2013

OTHER PUBLICATIONS

GDPR: Personal Data and Sensitive Personal Data, Burges Salmon, 5 pages, Nov. 21, 2016.
Imagined by a GAN, 1 page, http://thispersondoesnotexist.com, Dec. 2019.
"Diminished Reality Demo 3D Furniture Cloud", 1 page, found at: https://www.youtube.com/watch?v=anAm7AHYreQ.
(Continued)

*Primary Examiner* — Jason K Gee
(74) *Attorney, Agent, or Firm* — Brian D. Welle

(57) ABSTRACT

A set of one or more media items is identified by a first computer system configured to host media items for various users. The set of media items has a first relationship. A content analysis is performed on the set of one or more media items. The content analysis is based on a first machine-learning model. A first content pattern contained within the set of media items is determined based on the content analysis. A first set of one or more altered media items is generated in response to the first content pattern.

16 Claims, 7 Drawing Sheets

(56) References Cited

OTHER PUBLICATIONS

Vincent, James, "These faces show how far AI image generation has advanced in just four years". The Verge, Dec. 17, 2018 https://www.theverge.com/2018/12/17/18144356/ai-image-generation-fake-faces-people-nvidia-generative-adversarial-networks-gans.
Perez, Sarah, "Microsoft's new drawing bot is an AI artist", 13 pages, Jan. 18, 2018 https://techcrunch.com/2018/01/18/microsofts-new-drawing-bot-is-an-a-i-artist/.
AI Lab, Microsoft, 3 pages, downloaded on Nov. 19, 2020 from the following website: https://www.ailab.microsoft.com/experiments.
"Privacy Settings: Masking faces & objects for GDPR Compliance in Axxon Next VMS", 1 page, found at: https://www.youtube.com/watch?v=rSTdV_KeAgE.
T"he AI Quick Mask Tool—ON1 Photo RAW", Jan. 29, 2019, 1 page, found at: https://www.youtube.com/watch?v=sMpyUJIMOUM.
Mell, P. et al., "The NIST Definition of Cloud Computing", Recommendations of the National Institute of Standards and Technology, NIST Special Publication 800-145, 7 pages, Sep. 2011.

\* cited by examiner

PROACTIVE PRIVACY CONTENT HOSTING

BACKGROUND

The present disclosure relates to data security, and more specifically, to proactively protecting hosted content.

Media generated by a user may be hosted for various purposes. It may be advantageous to host the media at a remote server. The hosted media may include one or more content objects. The user may prefer to use the server to host the media but may not prefer that content objects in the media are shared.

SUMMARY

According to embodiments, disclosed are a method, system, and computer program product.

A set of one or more media items is identified by a first computer system configured to host media items for various users. The set of media items has a first relationship. A content analysis is performed on the set of one or more media items. The content analysis is based on a first machine-learning model. A first content pattern contained within the set of media items is determined based on the content analysis. A first set of one or more altered media items is generated in response to the first content pattern.

According to further embodiments, a first data-access request from a second computer system is detected. The first data-access request includes one or more data-access parameters; the first data-access request is directed to the set of media items. A first purpose of first data-access request is determined based on the one or more data-access parameters. A set of altered media items is selected from the plurality of sets of altered media items. The selection is based on the first purpose. The selected set of altered media items is transmitted in response to the first data-access request to the second computer system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
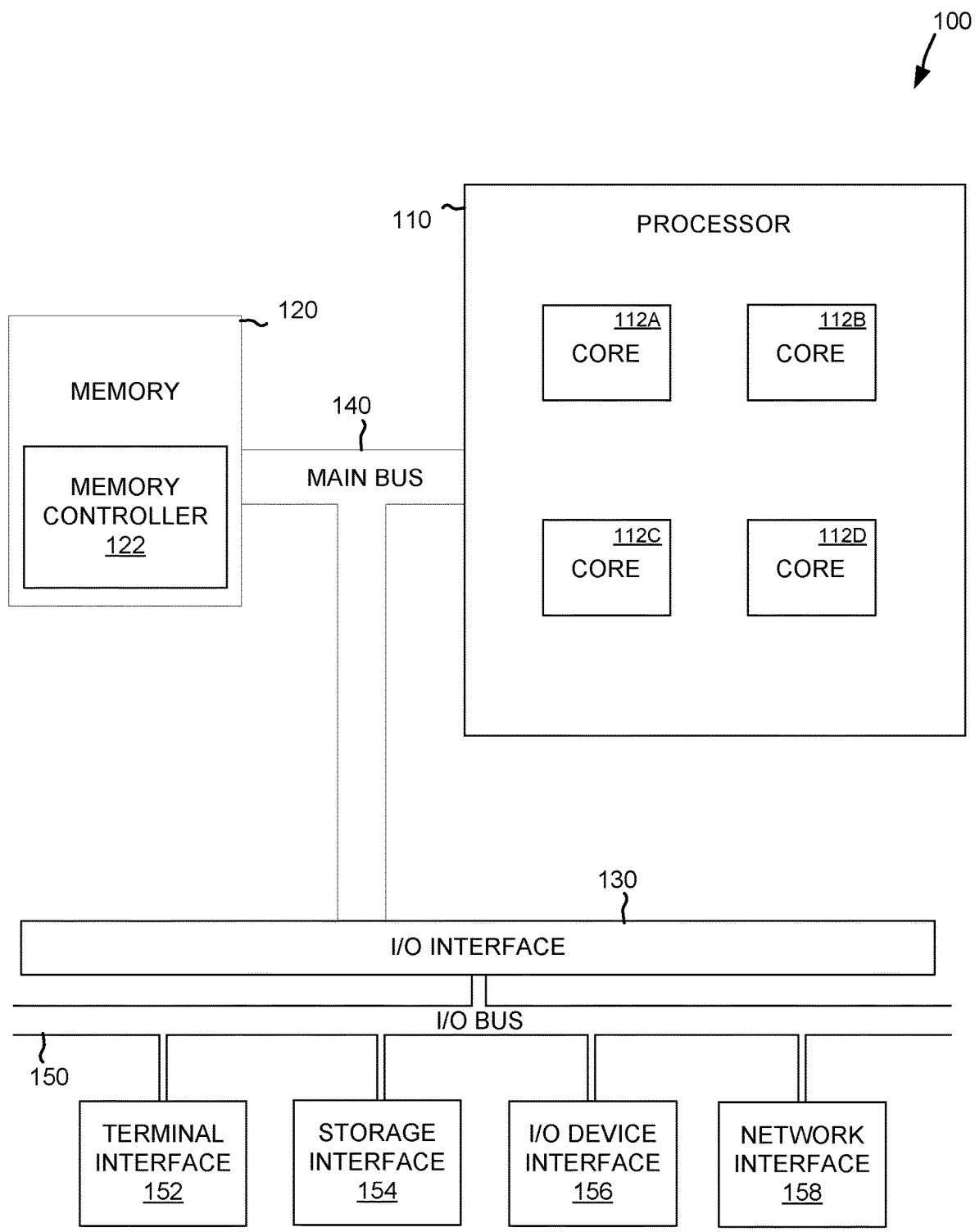
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to data security; more particular aspects relate to proactively protecting hosted content. While the present disclosure is not necessarily limited to such applications, various aspects of the disclosure may be appreciated through a discussion of various examples using this context.

Users are using online services to share media more frequently. The sharing of media has become a second-nature part of online computing with the rise of smartphones and pervasive internet connectivity. Media items may be visual in nature, such as still images, moving pictures, video streams, or other image and video items. Media items may be textual in nature, such as instant messages, social media posts, emails, private messages, online blogs, or other textual items that contain one or more textual strings.

Online services may benefit from the more frequent sharing of media by users. Specifically, an online service may operate by generating a service that is configured to accept images, text, videos, and other media items. The online service may be further configured to host the media items on the online service, and to permit the accessing of the media items by the user that uploaded the media. The online service may also be configured to host other users and their media items (e.g., facilitating users to post and share images and videos). For example, an online photo-hosting service may be configured to receive photos from a user device and may store and backup the photos for consumption by the user later. The online service may also be configured to facilitate semi-public sharing of the media items. For example, a social network may be configured to permit a user to post a picture of their home, and to facilitate sharing the post with the picture to other friends that are members of the social network.

It may be beneficial for the online services to grant some level of access to the stored media items. In detail, an online service may charge a nominal fee, or may not accept monetary compensation for users to post media items on the online service. By not charging users, the online service may become popular and may grow in size. The large number of users may result in a large amount of media items on the online service. The online service may charge customers a monetary fee to connect to the online service and derive value from the large number of users and large amount of media items. For example, an online advertiser may value the various information that can be derived from the media items. In another example, various organizations may wish to view the media items to derive value.

Online services and media item sharing may lead to a number of drawbacks. One drawback is computer image analysis that can be used to collect private information. Specifically, computer image analysis is improving, and it is becoming more feasible to identify various objects using image analysis methods and techniques. For example, an online advertiser may perform image analysis techniques (e.g., machine learning) to analyze various images stored by an online service. The online advertiser may be able to identify various information from images. Further, the machine learning technique may generate a corpus of knowledge, and if the corpus of knowledge is based on media that has private information, then, consequently, the knowledge corpus may also have private information.

Another drawback is that nefarious third parties may connect online and retrieve information regarding a user. For example, some online services may permit anyone to register and join the online service. A third party may join the online service and may observe information contained in the media items and may then use the private information against a user. For example, a user may post a picture of their home, and the picture may visually depict the street address of the home of the user. The user may also post a status message that indicates that the user has gone on vacation and left the home for a period of time. A third party may be able to identify by viewing the pictures that the user is not home and also the street address of the home of the user.

Yet another drawback is that certain regulations (e.g., General Data Protection Regulation) may place additional requirements on online services. Specifically, regulations may treat online services as data controllers. A data controller may be a person, company, or other entity when it comes to protecting the rights of the data subject. The data controller, as its name implies, controls the overall purpose and means, or the "why" and "how" the data is to be used. The data controller can also process the data by its own means. However, the regulations placed on the data controller may restrict the use or access of data given to a data controller by users. The restrictions may make it technically impossible to share media items with other entities.

Yet another drawback, is that users may determine that it is unsafe or undesirable to share media items with the online service. The media items may contain various information (e.g., visual information, textual information, auditory information, information in general) in the content of the media items. In some cases, the information can be private information, such as information that a user does not want to share outside of family or selected close friends. The private information may be any content that is private or sensitive. The private information may depend on various factors, such as association of object, relative position of the objects, dimension, shape, size of object, location of the content, and the like. For example, a user may share a photo with family about how they are recovering from an injury, such as a photo of the user walking their dog outside. The user may intent only to share the image with family and a couple friends, and so they may use the online service to disseminate the image. If users believe that private information is being shared with entities that they prefer not to share with, they may withdraw from, or not use the online services.

Proactive private content hosting (PPCH) may overcome the various drawbacks that are related to the use of online services. PPCH may operate by performing analysis on one or more media items that are hosted by an online service. The PPCH may identify that various media items have a relationship, such as being uploaded together, or by the same user, or by other users that are associated with or affiliated with the user. The PPCH may include computer systems configured to perform analysis on the one or more media items and to determine a content pattern based on various content that is contained in one or more of the identified media items. The PPCH may proactively perform the content analysis and pattern determination, such as upon initially receiving the content objects or at a time before the content objects are accessed by other entities. The PPCH may proactively alter the media items based on the identified pattern. For example, the PPCH, may be configured to perform an adjustment to or modification of an image to alter the image such that there is no longer a pattern within the media items.

The PPCH may enable proactive prevention of practical misuse of media items. For example, based on machine learning, the PPCH may dynamically be deciding which portion of the photograph needs to be redrawn, partially or completely, so that sensitivity of the photograph can be maintained (removing of sensitive information). The modification and/or alteration can prevent inadvertent misuses, such as elimination content objects in media items that, upon analysis by other computing systems, may incur or generate a bias. The PPCH may operate based on previous instances of use and or accessing of data from the system, or other computing systems. For example, the PPCH may dynamically identify the images of the person or objects that could be potential sensitive information based on knowledge corpus that contains historical data and previous patterns of media item usage; and, based on the knowledge corpus, using artificial neural networks alter the media items.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
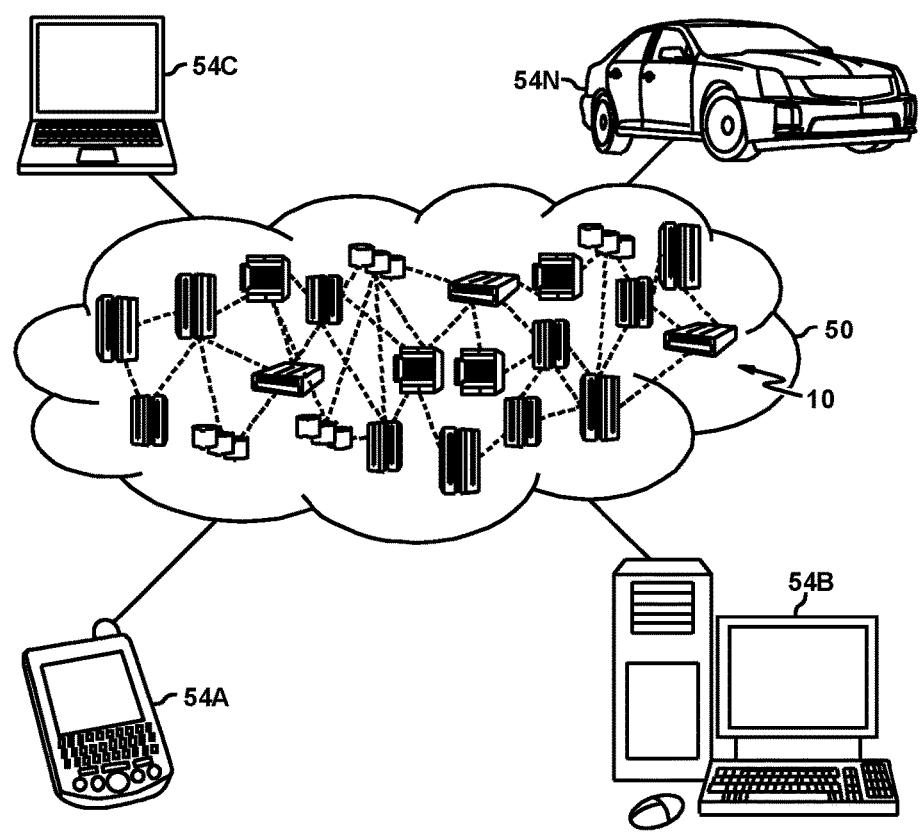
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
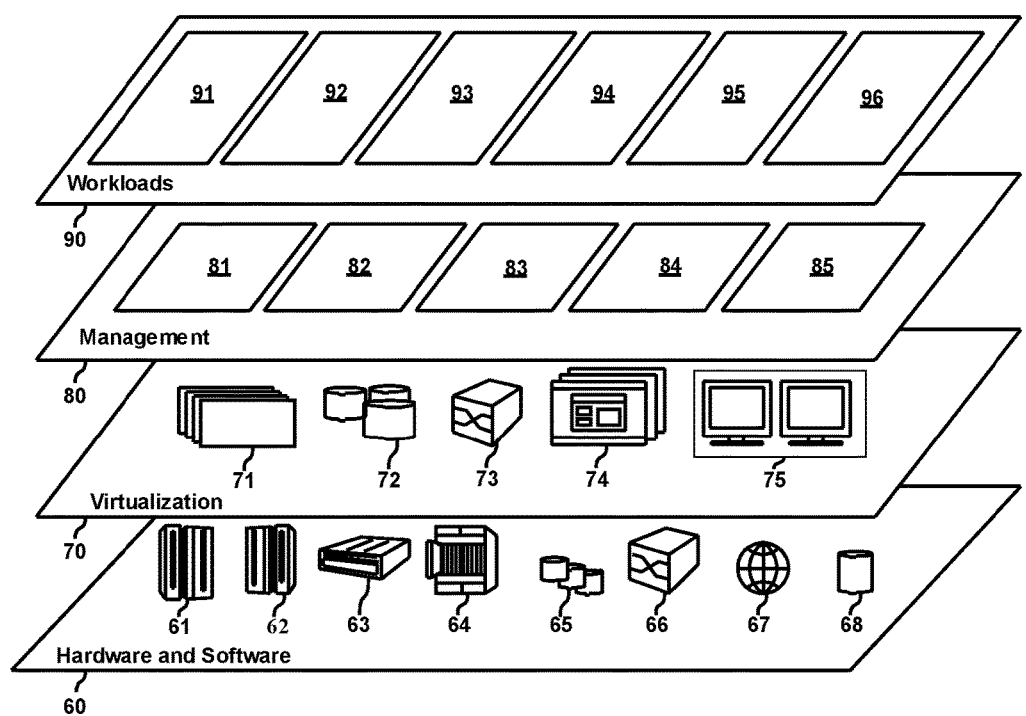
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and PPCH 96.

Figure 4:
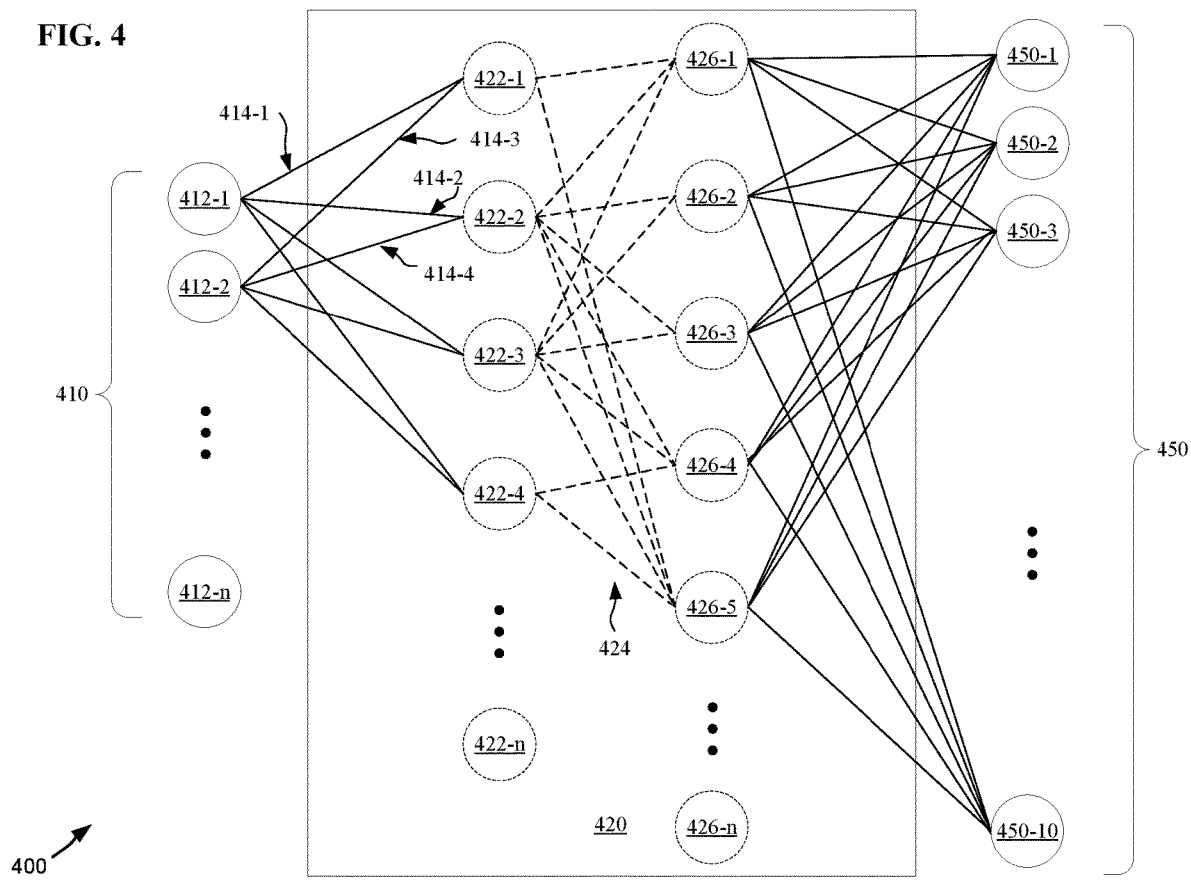
FIG. 4 depicts a model representative of one or more artificial neural networks capable of proactively performing content analysis on hosted media items consistent with embodiments of the present disclosure.

FIG. 4 depicts a model 400 representative of one or more artificial neural networks capable proactively performing content analysis on hosted media items consistent with embodiments of the present disclosure. The model neural network (neural network) 400 is made up of a plurality of layers. The neural network 400 includes an input layer 410, a hidden section 420, and an output layer 450. Though model 400 depicts a feed-forward neural network, it should be appreciated that other neural networks layouts may also be configured for performing content analysis on a set of media items such as a recurrent neural network layout (not depicted). In some embodiments, the neural network 400 may be a design-and-run neural network, and the layout depicted by the model may be created by a computer programmer. In some embodiments, the neural network 400 may be a design-by-run neural network, and the layout depicted may be generated by the input of data and by the process of analyzing that data according to one or more defined heuristics. The neural network 400 may operate in a forward propagation by receiving an input and outputting a result of the input. The neural network 400 may adjust the values of various components of the neural network by a backward propagation (back propagation).

The input layer 410 includes a series of input neurons 412-1, 412-2, up to 412-$n$ (collectively, 412) and a series of input connections 414-1, 414-2, 414-3, 414-4, etc. (collectively, 414). The input layer 410 represents the input from data that the neural network is supposed to analyze (e.g., the pixels of an image that is a part of a set of hosted media items). Each input neuron 412 may represent a subset of the input data. For example, the neural network 400 is provided with a media item that is a video as input, and each image of the video is represented by a series of pixels. In this example, input neuron 412-1 may be the first pixel of the picture, input neuron 412-2 may be the second pixel of the picture, etc. The number of input neurons 412 may correspond to the size of the input. For example, when the neural network is designed to analyze images that are 256 pixels by 256 pixels, the neural network 400 layout may include a series of 65,536 input neurons. The number of input neurons 412 may correspond to the type of input. For example when the input is a color image that is 256 pixels by 256 pixels, the neural network 400 layout may include a series of 196,608 input neurons (65,536 input neurons for the red values of each pixel, 65,536 input neurons for the green values of each pixel, and 65,536 input neurons for the blue values of each pixel). The type of input neurons 412 may correspond to the type of input. In a first example, the neural network 400 may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, the neural network 400 may be designed to analyze images that are color, and each of the input neurons may be a three dimensional vector to represent the color values of a given pixel of the input images (where the first component of the vector is a red whole-number value between 0 and 255, the second component of the vector is a green whole-number value between 0 and 255, and the third component of the vector is a blue whole-number value between 0 and 255).

The input connections 414 represent the output of the input neurons 412 to the hidden section 420. Each of the input connections 414 varies depending on the value of each input neuron 412 and based upon a plurality of weights (not depicted). For example, the first input connection 414-1 has a value that is provided to the hidden section 420 based on the input neuron 412-1 and a first weight. Continuing the example, the second input connection 414-2 has a value that is provided to the hidden section 420 based on the input neuron 412-1 and a second weight. Further continuing the example, the third input connection 414-3 based on the input neuron 412-2 and a third weight, etc. Alternatively stated, the input connections 414-1 and 414-2 share the same output component of input neuron 412-1 and the input connections 414-3 and 414-4 share the same output component of input neuron 412-2; all four input connections 414-1, 414-2, 414-3, and 414-4 may have output components of four different weights. Though the neural network 400 may have different weightings for each connection 414, some embodiments may contemplate weights that are similar. In some embodiments, each of the values of the input neurons 412 and the connections 414 may necessarily be stored in memory.

The hidden section 420 includes one or more layers that receive inputs and produce outputs. The hidden section 120 includes a first hidden layer of calculation neurons 422-1, 422-2, 422-3, 422-4, up to 422-n (collectively, 422); a second hidden layer of calculation neurons 426-1, 426-2, 426-3, 426-4, 426-5, up to 426-n (collectively 426); and a series of hidden connections 424 coupling the first hidden layer and the second hidden layer. It should be appreciated that model 400 only depicts one of many neural networks capable of performing content analysis of video, images, textual strings, or other media items consistent with some embodiments of the disclosure. Consequently, the hidden section 420 may be configured with more or fewer hidden layers (e.g., one hidden layer, seven hidden layers, twelve hidden layers, etc.)— two hidden layers are depicted for example purposes.

The first hidden layer 422 includes the calculation neurons 422-1, 422-2, 422-3, 422-4, up to 422-n. Each calculation neuron of the first hidden layer 422 may receive as input one or more of the connections 414. For example, calculation neuron 422-1 receives input connection 414-1 and input connection 414-3. Each calculation neuron of the first hidden layer 422 also provides an output. The output is represented by the dotted lines of hidden connections 424 flowing out of the first hidden layer 422. Each of the calculation neurons 422 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tan h neurons, softplus functions, softmax functions, rectified linear units, etc.). In some embodiments, each of the calculation neurons 422 also contains a bias (not depicted). The bias may be used to decide the likelihood or valuation of a given activation function. In some embodiments, each of the values of the biases for each of the calculation neurons must necessarily be stored in memory.

An example of model 400 may include the use of a sigmoid neuron for the activation function of calculation neuron 422-1. An equation (Equation 1, stated below) may represent the activation function of calculation neuron 422-1 as f(neuron). The logic of calculation neuron 422-1 may be the summation of each of the input connections that feed into calculation neuron 422-1 (i.e., input connection 414-1 and input connection 414-3) which are represented in Equation 1 as j. For each j the weight w is multiplied by the value x of the given connected input neuron 412. The bias of the calculation neuron 422-1 is represented as b. Once each input connection j is summed, the bias b is subtracted. Finalizing the operations of this example as follows: given a larger positive number of results from the summation and bias in activation f(neuron), the output of calculation neuron 422-1 approaches approximately 1; given a larger negative number results from the summation and bias in activation f(neuron), the output of calculation neuron 422-1 approaches approximately 0; and given a number somewhere in between a larger positive number and a larger negative results from the summation and bias in activation f(neuron), the output varies slightly as the weights and biases vary slightly.

$$f(\text{neuron}) = \frac{1}{1 + \exp\left(-\sum_j w_j x_j - b\right)} \quad \text{Equation 1}$$

The second hidden layer 426 includes the calculation neurons 426-1, 426-2, 426-3, 426-4, 426-5, up to 426-n. In some embodiments, the calculation neurons of the second hidden layer 426 may operate similarly to the calculation neurons first hidden layer 422. For example, the calculation neurons 426-1 to 426-n may each operate with a similar activation function as the calculation neurons 422-1 to 422-n. In some embodiments, the calculation neurons of the second hidden layer 426 may operate differently to the calculation neurons of the first hidden layer 422. For example, the calculation neurons 426-1 to 426-n may have a first activation function, and the calculation neurons 422-1 to 422-n may have a second activation function.

Likewise, the connectivity to, from, and between the various layers of the hidden section 420 may also vary. For example, the input connections 414 may be fully connected to the first hidden layer 422 and hidden connections 424 may be fully connected from the first hidden layer to the second hidden layer 426. In embodiments, fully connected may mean that each neuron of a given layer may be connected to all the neurons of a previous layer. In embodiments, fully connected may mean that each neuron of a given layer may function completely independently and not share any connections. In a second example, the input connections 414 may not be fully connected to the first hidden layer 422 and the hidden connections 424 may not be fully connected from the first hidden layer 422 to the second hidden layer 426.

Also, likewise the parameters to, from, and between the various layers of the hidden section 420 may also vary. In some embodiments, the parameters may include the weights and the biases. In some embodiments, there may be more or less parameters than the weights and biases. For example, the model 400 may be of a convolutional network. The convolutional neural network may include a sequence of heterogeneous layers (e.g., an input layer 410, a convolution layer 422, a pooling layer 426, and an output layer 450). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 450 includes a series of output neurons 450-1, 450-2, 450-3, up-to 450-n (collectively, 450). The output layer 450 holds a result of the analyzation of the neural network 400. In some embodiments, the output layer 450 may be a categorization layer used to identify a feature of the input to the neural network 400. For example, the neural network 400 may be a classification network trained to identify Arabic numerals. In such an example, the neural network 400 may include ten output neurons 450 corresponding to which Arabic numeral the network has identified (e.g., output neuron 450-2 having a higher activation value than output neurons 450 may indicate the neural network determined an image contained the number '1'). In some embodiments, the output layer 450 may be a real-value target (e.g., trying to predict a result when an input is a previous set of results) and there may be only a singular output neuron (not depicted). The output layer 450 is fed from an output connection 452. The output connection 452 provides the activations from the hidden section 420. In some embodiments, the output connections 452 may include weights and the output neurons 450 may include biases.

Training the neural network depicted by the model 400 may include performing back propagation. Back propagation is different from forward propagation. Forward propagation may include feeding of data into the input neurons 410; performing the calculations of the connections 414, 424, 452; and performing the calculations of the calculation neurons 422 and 426. The forward propagation may also be the layout of a given neural network (e.g., recurrence, number of layers, number of neurons in one or more layers, layers being fully connected or not to other layers, etc.). Back propagation may be used to determine an error of the parameters (e.g., the weights and the biases) in the neural network 400 by starting with the output neurons 450 and propagating the error backward through the various connections 452, 424, 414 and layers 426, 422, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination. For example, neural network 400 may be a classification network; may be provided with a 128 pixel by 250 pixel image input that contains content objects such as signs, faces, animals, and the number '3'; and may determine that the number is most likely '9' and is second most likely '2' and is third most likely '3' (and so on with other Arabic numerals). Continuing the example, performing a back propagation may alter the values of the weights of connections 414, 424, and 452; and may alter the values of the biases of the first layer of calculation neurons 422, the second layer of calculation neurons 426, and the output neurons 450. Further continuing the example, the performance of the back propagation may yield a future result that is a more accurate classification of the same 128 pixel by 250 pixel image input that contains the number '3' (e.g., more closely ranking '9', '2', then '3' in order of most likely to least likely, ranking '9', then '3', then '2' in order of most likely to least likely, ranking '3' the most likely number, etc.).

Equation 2 provides an example of the objective function in the form of a quadratic cost function (e.g., mean squared error)—other functions may be selected, and the mean squared error is selected for example purposes. In Equation 2, all of the weights may be represented by w and biases represented by b of an example network. The example network is provided a given number of training inputs n in a subset (or entirety) of training data that have input values x. The example network may yield output a from x and should yield a desired output y(x) from x. Back propagation or training of the example network should be a reduction or minimization of the objective function 'O(w,b)' via alteration of the set of weights and biases. Successful training of the example network should not only include the reduction of the difference between the example network's answer a and the correct answers y(x) for the input values x, but given new input values (e.g., from additional training data, from validation data, etc.).

$$O(w, b) \equiv \frac{1}{2n} \sum_{x} \|y(x) - a\|^2 \qquad \text{Equation 2}$$

Many options may be utilized for back propagation algorithms in both the objective function (e.g., mean squared error, cross-entropy cost function, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 400 may be small in any given iteration. Back propagation algorithms may need to be repeated for many iterations to perform accurate learning as a result of the necessitated smallness of any given iteration.

For example, neural network 400 may have untrained weights and biases, and back propagation may involve the stochastic gradient descent to train the network over a subset of training inputs (e.g., a batch of 10 training inputs from the entirety of the training inputs). Continuing the example, neural network 400 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.).

Figure 5:
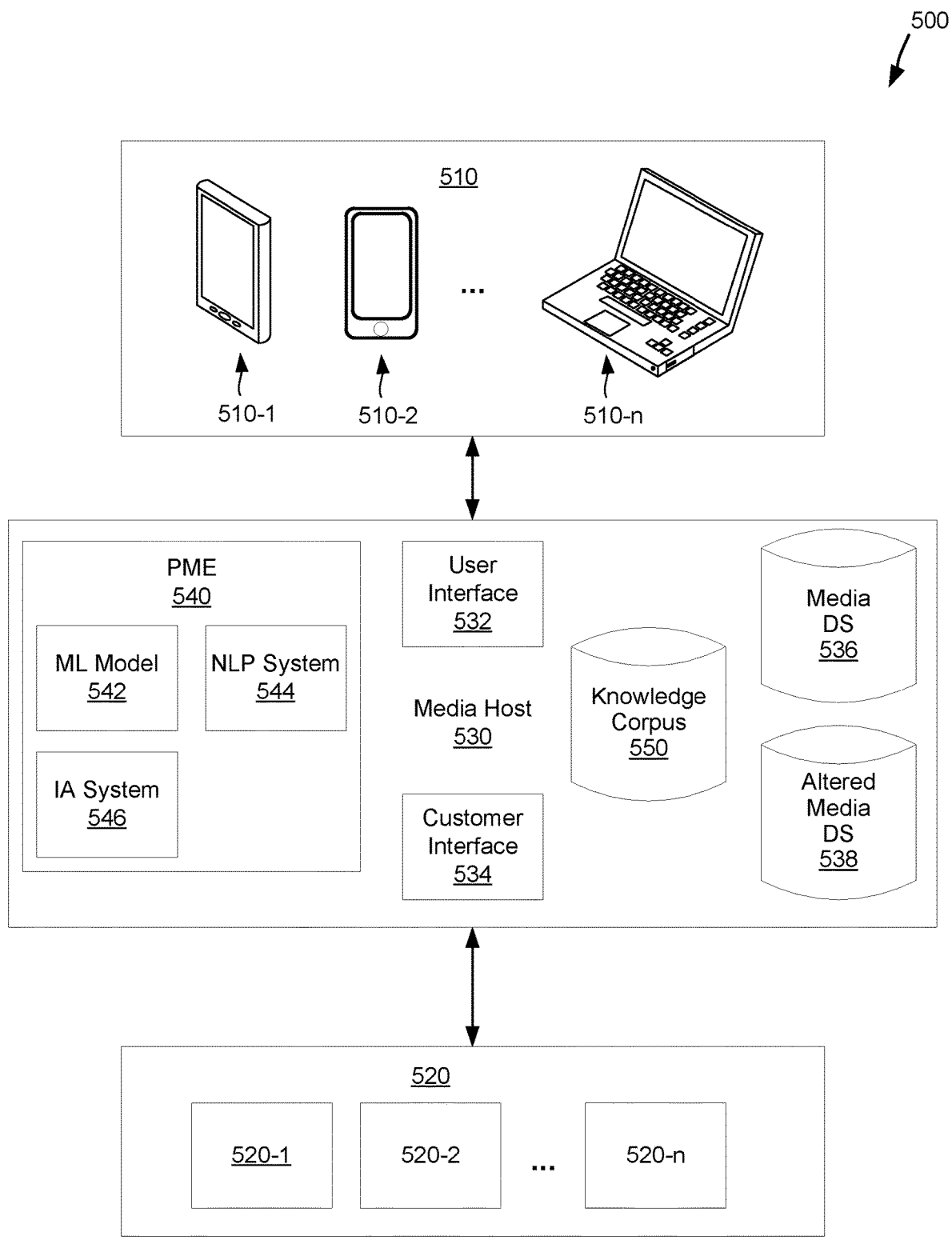
FIG. 5 depicts a system for proactively performing content analysis on user information, consistent with some embodiments of the disclosure.

FIG. 5 depicts a system 500 for proactively performing content analysis on user information, consistent with some embodiments of the disclosure. System 500 may be configured to proactively identify private information located in an identified set of media items. The set of media items may be a single media item (e.g., string of text, image). The set of media items may be a plurality of media items (e.g., a series of images from a vacation of a user, a plurality of text messages sent over a period of days or weeks). System 500 may operate to determine a content pattern based on the set of media items. For example, system 500 may be configured to identify content such as a person that is present in a series of pictures. System 500 may be configured to determine a content pattern on a set of media, based on the entity that is attempting to view the items.

System 500 may include the following: a plurality of user devices 510-1, 510-2, up to 510-n (collectively, 510); a plurality of customer devices 520-1, 520-2, up to 520-n (collectively, 520); and a media host 530 configured to perform PPCH. The user devices 510 may be computing devices, such as computer system 100. Each user device 510 may be configured to upload, share, post, or otherwise transmit media items (e.g., photos, text strings, videos), to the media host 530. The customer devices 520 may be computing devices, such as computer system 100. Each customer device 520 may be configured to view, retrieve, or otherwise attempt to access the media items stored by the media host 530.

The media host 530 may be a single computer system, such as computer system 100. The media host 530 may be a part of a cloud computing system, such as part of cloud computing environment 50. The media host 530 may include the following: a user interface 532, a customer interface 534, a media item datastore 536, and an altered media item datastore 538. The user interface 532, may be one or more interfaces configured to facilitate interaction between the user devices 510 and the media host 530. For example, the user interface 532, may be a plurality of application programming interfaces, graphical user interfaces, and data access models. The user interface 532 may receive communication from the user devices 510, and may responsively, permit the storing, viewing, and retrieval of media items in the media item datastore 536. The customer interface 534, may be one or more interfaces configured to facilitate interaction between the customer devices 520 and the media host 530. For example, the customer interface 534, may be a plurality of application programming interfaces, graphical user interfaces, and data access models. The customer interface 534 may receive communication from the customer devices 520, and may responsively, permit the storing, viewing, and retrieval of altered media items in the altered media item datastore 538.

The media item datastore 536 and the altered media item datastore 538 may be portions of a single datastore, such as a single storage device, logical database, or other computer storage construct. In some embodiments, the media item datastore 536 and the altered media item datastore 538 may be separate datastores. For example, media item datastore 536 may be a first logical volume located on a first logical storage device. Further, altered media item datastore 538 may be a second logical volume located on a second logical storage device. The media item datastore 536 may be accessible through a secure process, such that only the user device 510 that actually uploaded the original (e.g., unaltered) media item, may be the only entity outside of the media host 530 that may later access the media item. For example, user device 510-2 may upload a media item to the media item datastore 536. The user device 510-2 may set a sharing instruction, to share the uploaded media item. The media host 530 may be configured to create a copy of the uploaded media item and store the copy in the altered media item datastore 538. If a second user device 510-1 or a customer device 520-2 requests access to the uploaded media item, only access to the copy stored in the altered media item datastore 538 may be granted.

The media host 530 may also include a proactive media engine 540 ("PME") configured to view media items and proactively analyze, categorize, and alter media items. The PME 540 may include the following: a machine learning model ("ML model") 542, a natural language processing system ("NLP system") 544, and an image analysis system ("IA System") 546. The ML model 542 may be a machine learning model, or other artificial intelligence system, and may be in the form of a neural network, such as neural network 400.

In some embodiments, the ML model 542 may execute machine learning on data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

In some embodiments, the NLP system 544 may include various components (not depicted) operating through hardware, software, or in some combination. For example, a natural language processor, one or more data sources, a search application, and a report analyzer. The natural language processor may be a computer module that analyses the received content and other information. The natural language processor may perform various methods and techniques for analyzing textual information (e.g., syntactic analysis, semantic analysis, etc.). The natural language processor may be configured to recognize and analyze any number of natural languages. In some embodiments, the natural language processor may parse passages of documents or content from media items include text strings, images, and videos. Various components (not depicted) of the natural language processor may include, but are not limited to, a tokenizer, a part-of-speech (POS) tagger, a semantic relationship identifier, and a syntactic relationship identifier. The natural language processor may include a support vector machine (SVM) generator to processor the content of topics found within a corpus and classify the topics.

In some embodiments, the tokenizer may be a computer module that performs lexical analyses. The tokenizer may convert a sequence of characters into a sequence of tokens. A token may be a string of characters included in an electronic document and categorized as a meaningful symbol. Further, in some embodiments, the tokenizer may identify word boundaries in an electronic document and break any text passages within the document into their component text elements, such as words, multiword tokens, numbers, and punctuation marks. In some embodiments, the tokenizer may receive a string of characters, identify the lexemes in the string, and categorize them into tokens.

Consistent with various embodiments, the POS tagger may be a computer module that marks up a word in passages to correspond to a particular part of speech. The POS tagger may read a passage or other text in natural language and assign a part of speech to each word or other token. The POS tagger may determine the part of speech to which a word (or other text element) corresponds based on the definition of the word and the context of the word. The context of a word may be based on its relationship with adjacent and related words in a phrase, sentence, or paragraph.

In some embodiments, the context of a word may be dependent on one or more previously analyzed electronic documents (e.g., a first text string, and a second text string). Examples of parts of speech that may be assigned to words include, but are not limited to, nouns, verbs, adjectives, adverbs, and the like. Examples of other part of speech categories that POS tagger may assign include, but are not limited to, comparative or superlative adverbs, wh-adverbs, conjunctions, determiners, negative particles, possessive markers, prepositions, wh-pronouns, and the like. In some embodiments, the POS tagger may tag or otherwise annotate tokens of a passage with part of speech categories. In some embodiments, the POS tagger may tag tokens or words of a passage to be parsed by the NLP system 544.

In some embodiments, the semantic relationship identifier may be a computer module that may be configured to identify semantic relationships of recognized text elements (e.g., words, phrases) in documents. In some embodiments, the semantic relationship identifier may determine functional dependencies between entities and other semantic relationships.

Consistent with various embodiments, the syntactic relationship identifier may be a computer module that may be configured to identify syntactic relationships in a passage composed of tokens. The syntactic relationship identifier may determine the grammatical structure of sentences such as, for example, which groups of words are associated as phrases and which word is the subject or object of a verb. The syntactic relationship identifier may conform to formal grammar.

In some embodiments, the natural language processor may be a computer module that may parse a document and generate corresponding data structures for one or more portions of the document. For example, in response to receiving a text string that is part of a shared blog post from a user device 510 at the NLP system 544, the natural language processor may output parsed text elements from the data. In some embodiments, a parsed text element may be represented in the form of a parse tree or other graph structure. To generate the parsed text element, the natural language processor may trigger computer modules including the tokenizer, the part-of-speech (POS) tagger, the SVM generator, the semantic relationship identifier, and the syntactic relationship identifier.

The IA system 546 may be a collection of hardware and software, such as an application specific integrated circuit. The IA system 546 may be configured to perform various image analysis techniques. The image analysis techniques may be machine learning and/or deep learning-based techniques. These techniques may include, but are not limited to, region-based convolutional neural networks (R-CNN), you only look once (YOLO), edge matching, clustering, grayscale matching, gradient matching, invariance models, geometric hashing, scale-invariant feature transform (SIFT), speeded up robust feature (SURF), histogram of oriented gradients (HOG) features, and single shot multibox detector (SSD). In some embodiments, the IA system 546 may be configured to aid in identifying a content objects in a media item or across a set of media items.

In some embodiments, objects may be identified using an object detection algorithm, such as an R-CNN, YOLO, SSD, SIFT, Hog features, or other machine learning and/or deep learning object detection algorithms. The output of the object detection algorithm may include one or more identities of one or more respective objects with corresponding match certainties. For example, a set of media items may be analyzed. Using a relevant object detection algorithm, a content object may be identified.

In some embodiments, features of the objects may be determined using a supervised machine learning model built using training data. For example, an image may be input into the supervised machine learning model and various classifications detected within the image can be output by the model. For example, characteristics such as object material (e.g., cloth, metal, plastic, etc.), shape, size, color, and other characteristics may be output by the supervised machine learning model. Further, the identification of objects (e.g., a tree, a human face, a dog, etc.) can be output as classifications determined by the supervised machine learning model. For example, if a user snaps an image of their vehicle, a supervised machine learning algorithm may be configured to output an identity of the object (e.g., automobile) as well as various characteristics of their vehicle (e.g., the model, make, color, etc.).

In some embodiments, characteristics of objects may be determined using photogrammetry techniques. For example, shapes and dimensions of objects may be approximated using photogrammetry techniques. As an example, if a user provides an image of a basket, the diameter, depth, thickness, etc. of the basket may be approximated using photogrammetry techniques. In some embodiments, characteristics of objects may be identified by referencing an ontology. For example, if an object is identified (e.g., using an R-CNN), the identity of the object may be referenced within an ontology to determine corresponding attributes of the object. The ontology may indicate attributes such as color, size, shape, use, etc. of the object.

Characteristics may include the shapes of objects, dimensions (e.g., height, length, and width) of objects, a number of objects (e.g., a pair of humans riding a single tandem bicycle), colors of object, and/or other attributes of objects. In some embodiments, the output may generate a list including the identity and/or characteristics of objects (e.g., cotton shirt, metal glasses, etc.). In some embodiments, the output may include an indication that an identity or characteristic of an object is unknown. The indication may include a request for additional input data that can be analyzed such that the identity and/or characteristics of objects may be ascertained. For example, a user device 510 that initially uploaded a media item may be prompted to provide feature identifications and descriptions of the content objects. In some embodiments, various objects, object attributes, and relationships between objects (e.g., hierarchical and direct relations) may be represented within a knowledge graph (KG) structure. Objects may be matched to other objects based on shared characteristics (e.g., skin-tone of a cheek of a person and skin-tone of a chin of a person, multiple feathers located on or around a bird), relationships with other objects (e.g., an eye belongs to a face), or objects belonging to the same class (e.g., two bolt-heads are metric sized).

The PME 540 may be configured to identify a pattern in media items. Specifically, the PME 540 may be configured to identify one or more content objects in a media item (or a set of multiple media items) based on the ML model 542, the NLP system 544, and/or the IA system 546 performing various artificial intelligence and computing analysis on the media items. For example, the PME 540 may perform may one or more combination of relevant operations, such as Syntax/Semantics/Pragmatics analysis. Content objects may be any subject that could be visualized, depicted, described, stated, illustrated, enumerated, stated, or otherwise in or a part of a media item. Further, the PME 540 may be configured to determine a pattern of content objects. For example, a sailboat in a first visual frame of a video, and the same sailboat in a second frame of the same video. In another example, a first unique individual in a picture participating in a hobby, and a second unique individual in a second picture participating in the same hobby. The PME 540 may also be configured to identify a sensitive relationship between various content objects in a media item. For example, a first person in a first photograph and a second person in a second photograph may not have any sensitive meaning or relationship. A first person and a location, however, may have a particular sensitive meaning. A first person and a second person in the same photograph may also have a particular purpose, intent or meaning.

The PME 540 may be configured to operate based upon a knowledge corpus 550. Specifically, knowledge corpus 550 may be a data structure that includes multiple documents, entities, and other information. The knowledge corpus 550 may be stored by the PME 540 and as a data structure served by the media host 530. The knowledge corpus 550 may be augmented, added to, or otherwise updated based on operation of the system 500. For example, as user devices 510 upload media items, the knowledge corpus 550 may be updated with data from the PME 540 based on performing machine learning, natural language processing, and image analysis. The knowledge corpus 550 may contain historical data, trends, content patterns, or other relations between various content objects contained in media items. For example, the PME 540 may extract various information about any person, and their usage, habits, movements, patterns, and related machine-learning results (e.g., predicted behaviors, preferences, and the like). The extracted information and machine learning results may be used and added to the knowledge corpus 550.

As customer devices 520 access, and request access to media items, the knowledge corpus 550 may be updated with data from the PME 540 based on performing machine learning, natural language processing, and image analysis. Consequently, the knowledge corpus 550 may contain information regarding trends, intents, purposes, rules, associations, and goals from the customer devices 520. For example, the PME 540 may determine that a first customer device 520-1 is an advertising agency computer system, and the first customer device is configured to look for people and recognize faces and apparel. In another example, the PME 540 may determine a content pattern that customer devices 520 that belong to a certain Internet Protocol ("IP") range are devices owned and operated by a luxury automobile maker, and that the luxury automobile maker is scanning photos and videos for depictions that relate to the weather and road conditions contained in the photos. In another example, the PME 540 may identify an access pattern of a particular media item that is different than other media items and adjust the sensitivity or identify a content pattern based on the access pattern of the particular media item.

The PME 540 may also identify any sensitive or private information in the media items (e.g., names, locations, demographics, affiliations, memberships, physical conditions, unique markings, physical appearance, behaviors).

The PME 540 may alter one or more media items for the media host 530. The alteration may include the modification of the appearance of various content objects in the media items. Specifically, one or more of the following alterations may be performed selectively to a portion of a media item that contains a content object: repositioning of the objects; changing relative size; changing a dimension and/or shape of the objects; a replacement of one or more objects; interchanging the position of multiple objects; changing the color of objects; replacing background of the images; altering the relative dimension and position of the objects; adjusting a motion, relative speed, and/or depth parameter of the objects; replacing and/or removing the identification marks on certain objects, etc. The alteration may also include masking, blurring, dimming, blending, de-contrasting, aliasing, or otherwise obscuring. The PME 540 may perform a technique to redraw or replace certain elements in a media item (e.g., a Diminished Reality technique, a contextual replacement of one or more content objects, a computer-generated face based on a generated adversarial network facial-generation technique, a machine learning and image generation technique to draw various items for repositioning them within an image or video, using artificial neural networks to manipulate and/or combine the existing media items using autoencoders and generative adversarial networks).

The PME 540 may be configured to alter the one or more media items such that a customer device 520 may not derive any meaning. Specifically, the PME 540 may utilize the knowledge corpus 550 to determine the intent or purpose of a particular given customer device 520 (e.g., advertising, medical information gathering, etc.). Further, the PME 540 may utilize the determined intents and purposes to remove or otherwise alter the content objects contained in one or more media items such that the given customer device 520 cannot perform analysis to determine any semantic meaning. Removing semantic meaning, may include altering a content object such that any type of artificial intelligence, image analysis, language processing, or any other relevant machine learning technique to identify a pattern, trend, or any other relationship of subjects and contents from media items. For example, the PME 540 may determine a sensitive correlation of a particular medical condition of a user in a series of photos. The PME 540 may further alter the series of photos, such that no sensitive correlation is discovered from the set of media contents upon analysis or inspection by customer device 520-2 of an advertiser; consequently, the advertiser may not be able to derive any sort of pattern for advertisement purposes.

The PME 540 may not alter a particular media item based on a particular identified intent, purpose, or source of a particular customer device 520. For example, if the PME 540 determines that a given customer device 520 is a computer system of a news organization, then the PME 540 may not generate an altered version of the media item. This may facilitate the accurate capture of information and meaning from unaltered media items. In some embodiments, the PME 540 may unalter or undo the previous altering of a given media item. For example, initially at a first time period, an advertiser may attempt to access a particular image from the media host 530, and responsively the media host 530 may provide access to an altered version of the image stored in the altered media datastore 538. At a second time period after the first time period, a new organization may attempt to access the same image. Responsive to determining the purpose and/or source of the particular computing device 520 is for a news purpose, the media host 530 may instruct the PME 540 to undo the alterations that were done to the image stored in the altered media datastore 538 before the media host 530 provides access to the altered media datastore 538.

The operations of the PME 540 may be stored in the altered media datastore 538. The unaltered original version of media items may remain in the media datastore 536. The altered media datastore 538 may be the source of data that the media host 530 uses to respond to access requests. Because only altered versions of media items are stored in the altered media datastore 538, access for requests from other user devices 510 or customer devices 520 that may request or be granted access to the media items, may only be able to access altered media items. The altering, performed by the PME 540, may be done such that a customer device 520 may not determine that any alteration was performed. For example, the altering may be performed upon initially receiving the media items from a user device 510. The various machine learning, and analysis techniques performed at the PME 540, may be done and completed shortly after (e.g., seconds, minutes, hours), the media host 530 receives and stores, in the media datastore 536, the original images. The altered versions of the media items may be stored in the altered media datastore 538, nearly contemporaneously with the receipt and analysis. At any time later, a customer device 520 that requests access to a particular media item may instantly (e.g., within a few milliseconds, within a few seconds) be responded to with a link to an altered media item located in the altered media datastore 538. This may provide a practical advantage, in that the customer device 520 may not determine that any additional processing is being performed on the media items.

The providing of access to altered media items and original media items may be based on one or more preferences of the user. For example, a given user device 510 may transmit media items to the media host 530. The user device 510, concurrently or at another time, may also transmit rules, preferences, attributes, or other variables that are related to a single media item, a set of media items, or a group of media items matching a particular category (e.g., photos near a particular location, videos taken within a particular period of time, textual streams that are provided to a certain audience). The media host 530 may store the preferences, and the preferences may be used by the PME 540 to influence the type of alterations performed on the media items before they are stored, as altered media items, in the altered media datastore 538. The preferences may also state that certain other user devices 510 and/or customer devices 520 may have access to unaltered media items in the media datastore 536 and/or only altered items in the altered media datastore 538. For example, user device 510-1 can view the photograph as is published by user device 510-2, customer device 520-1 may view change of faces of two people present in the photograph out of ten people present in the photograph, customer device 520-2 may be able to view change of relative position of the friends in the photograph, customer device 520-2 may view only five specific people in the photograph.

The intent of the request may be based on previously collected information, such as one or more markets, defined data usage patterns, product or advertising affiliates, or other information of the specific type of data customer. The data-access parameters of the request.

Figure 6:
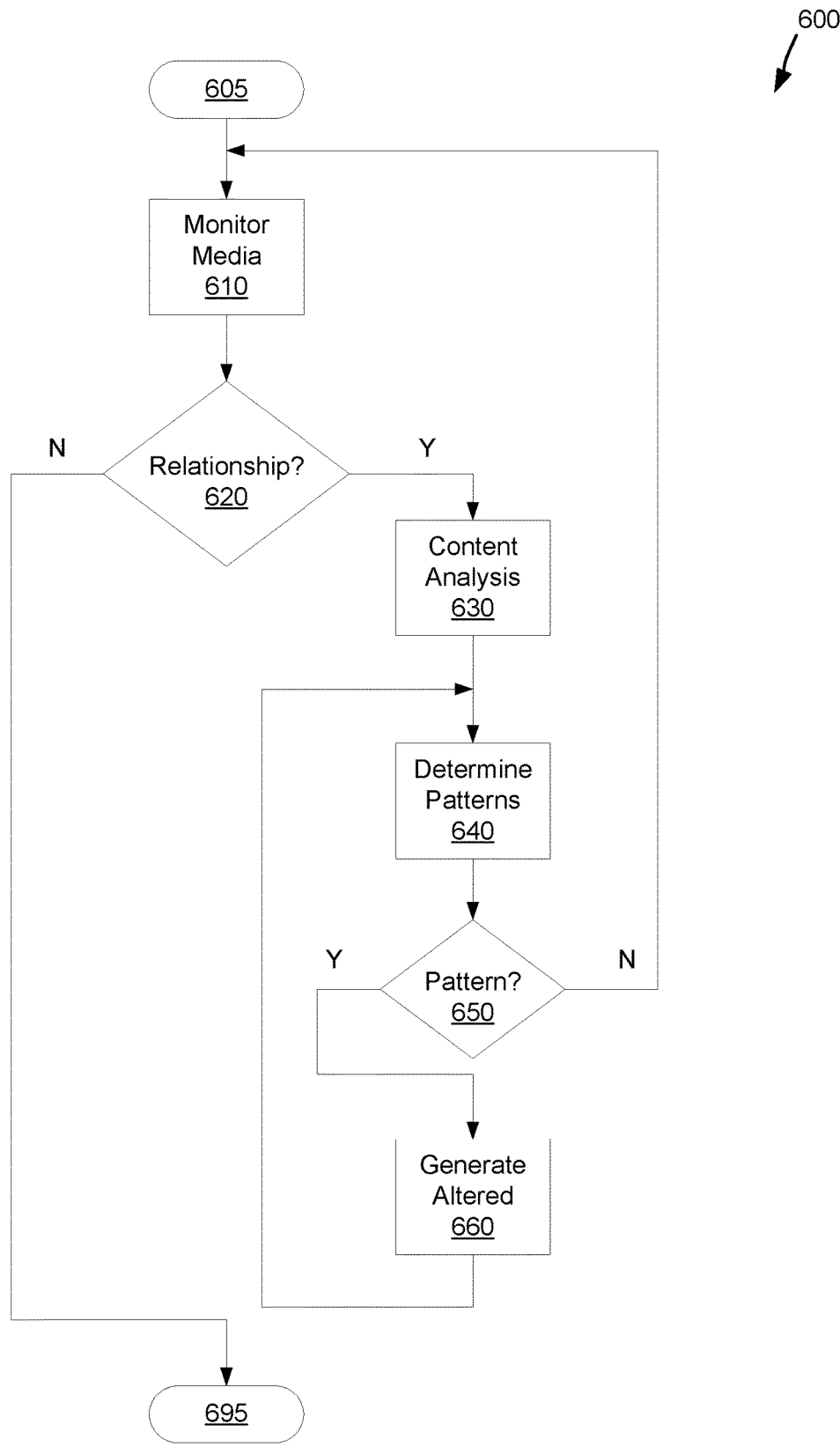
FIG. 6 depicts an example method of content analysis on media items, consistent with some embodiments of the disclosure.

FIG. 6 depicts an example method 600 of content analysis on media items, consistent with some embodiments of the disclosure. Method 600 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). The operations method 600 may be performed in the order depicted or may be performed in any other order. In some embodiments, method 600 may be performed responsive to an input, or continuously until terminated.

From start 605, a set of one or more media items may be monitored for a relationship at 610. The monitoring may be executed by an online service that hosts the media items, such as media host 530. The relationship may be that a set of media items are transmitted together from a user device. The relationship may be that the set of media items are contained in the same datastore, or posted to a corresponding blog post.

If a relationship is identified, at 620:Y, then a content analysis may be performed at 630. The content analysis may be performed by a neural network, such as neural network 400. The content analysis may include the use of one or more machine learning, image analysis, and/or language processing techniques.

A content pattern may be determined at 640. The content pattern may be determined based on the content analysis, performed at 630. The content pattern may be a relationship between content objects within or across one or more media items (e.g., a picture having a first subject and a second subject, a first subject in both a first frame and a second frame of a video). The content pattern may also have a related purpose. The purpose may be based on the content analysis, performed at 630.

If a content pattern is determined, at 650:Y, then the set of one or more media items may be altered at 660. The alterations may be performed by the online system that hosts the media items, such as media host 530. After the media items are altered, at 660, method 600 may continue by determining the presence of additional content patterns at 640.

If there are no content patterns determined, at 650:N, then method 600 may continue to monitor for media items for relationships, at 610. If there are no relationships detected in a set of media items, at 620:N, method 600 may end at 695.

Figure 7:
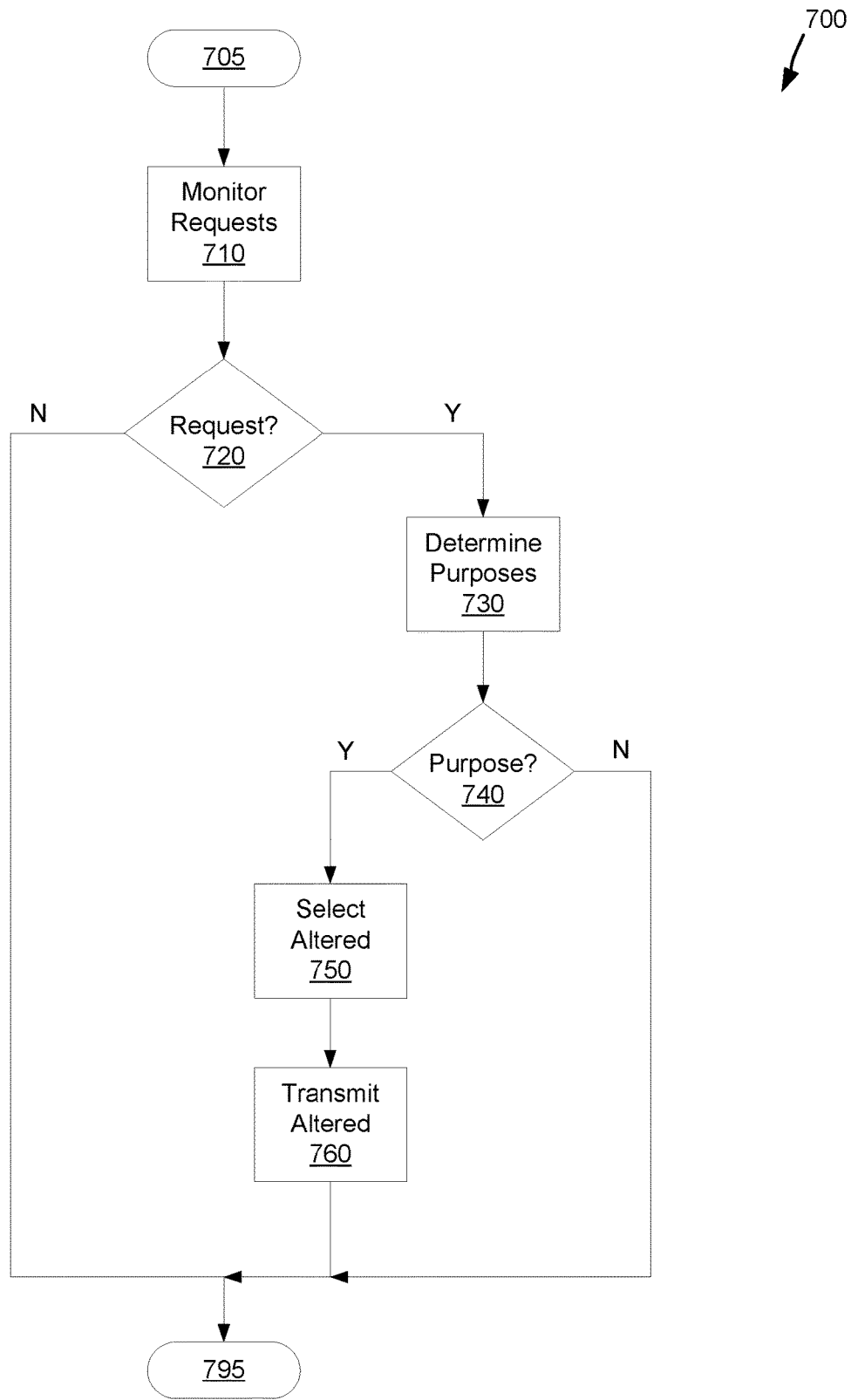
FIG. 7 depicts an example method of responding to requests for media items, consistent with some embodiments of the disclosure.

FIG. 7 depicts an example method 700 of responding to requests for media items, consistent with some embodiments of the disclosure. Method 700 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

From start 705, an input/output of a computer may be monitored for data-access requests at 710. The data-access requests may be monitored to determine if the is directed to one or more media items. The monitoring may include scanning one or more data-access parameters of the data-access requests.

If a data-access request is directed to a media item, at 720:Y, a purpose of the data-access request may be determined at 730. The purpose may be a type of usage of the media item, such as sharing with a friend or for advertising or machine learning.

If a purpose of the data-access request is determined, at 740:Y, then an altered media item may be selected at 750. The altered media item may be selected based on the specific requestor, such as the type of entity that is making the request. The altered media item may be selected based on the purpose or intent of the request. For example, if the request is to process the data for advertising, a first type of altered media item may be selected. At 760 the selected altered media item may be transmitted to the requestor.

If a purpose of the request is not detected, at 740:N, or if there was no request detected, at 720:N, or after the selected altered media was transmitted, at 760, method 700 may end at 795.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   identifying, by a first computer system configured to host media items for various users, a first and second set of media items;
   determining to skip altering media items of the second set of media items in response to the second set of media items not having a relationship that indicates a shared origin;
   identifying that media items of the first set of media items have a first relationship;
   performing, based on a first machine-learning model and in response to the first set of media items having the first relationship, a content analysis on the first set of media items;
   determining, based on the content analysis, a first content pattern contained within the first set of media items;
   detecting a first data-access request from a second computer system sent during a computing session, where the first data-access request is directed to the first set of media items;
   determining a first purpose of the first data-access request by comparing data of the computing session and the second computer system against a corpus that contains historical data access requests and purpose determinations for computing session factors; and
   generating, in response to the first content pattern, a first set of one or more altered media items that is altered responsive to the first purpose.

2. The method of claim 1 further comprising:
   determining, based on the content analysis, a second content pattern contained within the first set of media items; and
   generating, in response to the second content pattern, a second set of one or more altered media items.

3. The method of claim 1 further comprising:
   associating the first set of altered media items with first the set of media items; and
   storing, in a data store, a plurality of sets of altered media items including the first set of altered media items.

4. The method of claim 1, wherein the generating the first set of altered media items further comprises:
   creating a third set of media items, wherein each media item in the third set of media items is a copy of each media item in the first set of media items; and
   altering, based on the first content pattern, each media item in the third set of media items.

5. The method of claim 1, wherein
   the first set of media items includes a video,
   the video includes a plurality of video images, and
   the altering includes altering one or more content objects in a subset of the plurality of video images.

6. The method of claim 1, wherein
   the first set of media items includes a static image, and
   the altering includes altering one or more content objects in the static image.

7. The method of claim 1, wherein
   the first set of media items includes a textual string, and
   the altering includes altering one or more content objects in the textual string.

8. The method of claim 1, wherein the first machine-learning model is based on a knowledge corpus that includes the corpus related to data access requests, and wherein the method further comprises:
   creating the knowledge corpus from user information related to the first set of media items.

9. The method of claim 8 further comprising:
updating the knowledge corpus based on a received data-access request.

10. The method of claim 1, wherein the first relationship is the first set of media items are received from the same location.

11. The method of claim 1, wherein the first relationship is the first set of media items are received from the same user.

12. The method of claim 1, wherein the first relationship is the first set of media items are received from the same user device.

13. The method of claim 1, wherein the first relationship is a time of receipt where the first set of media items are received during the same time period.

14. A system, the system comprising:
a memory, the memory containing one or more instructions; and
a processor, the processor communicatively coupled to the memory, the processor, in response to reading the one or more instructions, configured to:
identify, by a first computer system configured to host media items for various users, a first and second set of media items;
determine to skip altering media items of the second set of media items in response to the second set of media items not having a relationship that indicates a shared origin;
identify that media items of the first set of media items have a first relationship;
perform, based on a first machine-learning model and in response to the first set of media items having the first relationship, a content analysis on the first set of media items;
determine, based on the content analysis, a first content pattern contained within the first set of media items;
detect a first data-access request from a second computer system sent during a computing session, where the first data-access request is directed to the first set of media items;
determine a first purpose of the first data-access request by comparing data of the computing session and the second computer system against a corpus that contains historical data access requests and purpose determinations for computing session factors; and
generate, in response to the first content pattern, a first set of one or more altered media items that is altered responsive to the first purpose.

15. The system of claim 14, wherein the first machine-learning model is based on a knowledge corpus that includes the corpus related to data access requests, and wherein the processor is further configured to:
create the knowledge corpus from user information related to the first set of media items.

16. A computer program product, the computer program product comprising:
one or more computer readable storage media; and
program instructions collectively stored on the one or more computer readable storage media, the program instructions configured to:
identify, by a first computer system configured to host media items for various users, a first and second set of media items;
determine to skip altering media items of the second set of media items in response to the second set of media items not having a relationship that indicates a shared origin;
identify that media items of the first set of media items have a first relationship;
perform, based on a first machine-learning model and in response to the first set of media items having the first relationship, a content analysis on the first set of media items;
determine, based on the content analysis, a first content pattern contained within the first set of media items;
detect a first data-access request from a second computer system sent during a computing session, where the first data-access request is directed to the first set of media items;
determine a first purpose of the first data-access request by comparing data of the computing session and the second computer system against a corpus that contains historical data access requests and purpose determinations for computing session factors; and
generate, in response to the first content pattern, a first set of one or more altered media items that is altered responsive to the first purpose.

* * * * *